J. CRONIN.
IMPLEMENT FOR MANIPULATING WIRES ON HIGH VOLTAGE CIRCUITS.
APPLICATION FILED MAY 13, 1912.
1,045,680.
Patented Nov. 26, 1912.
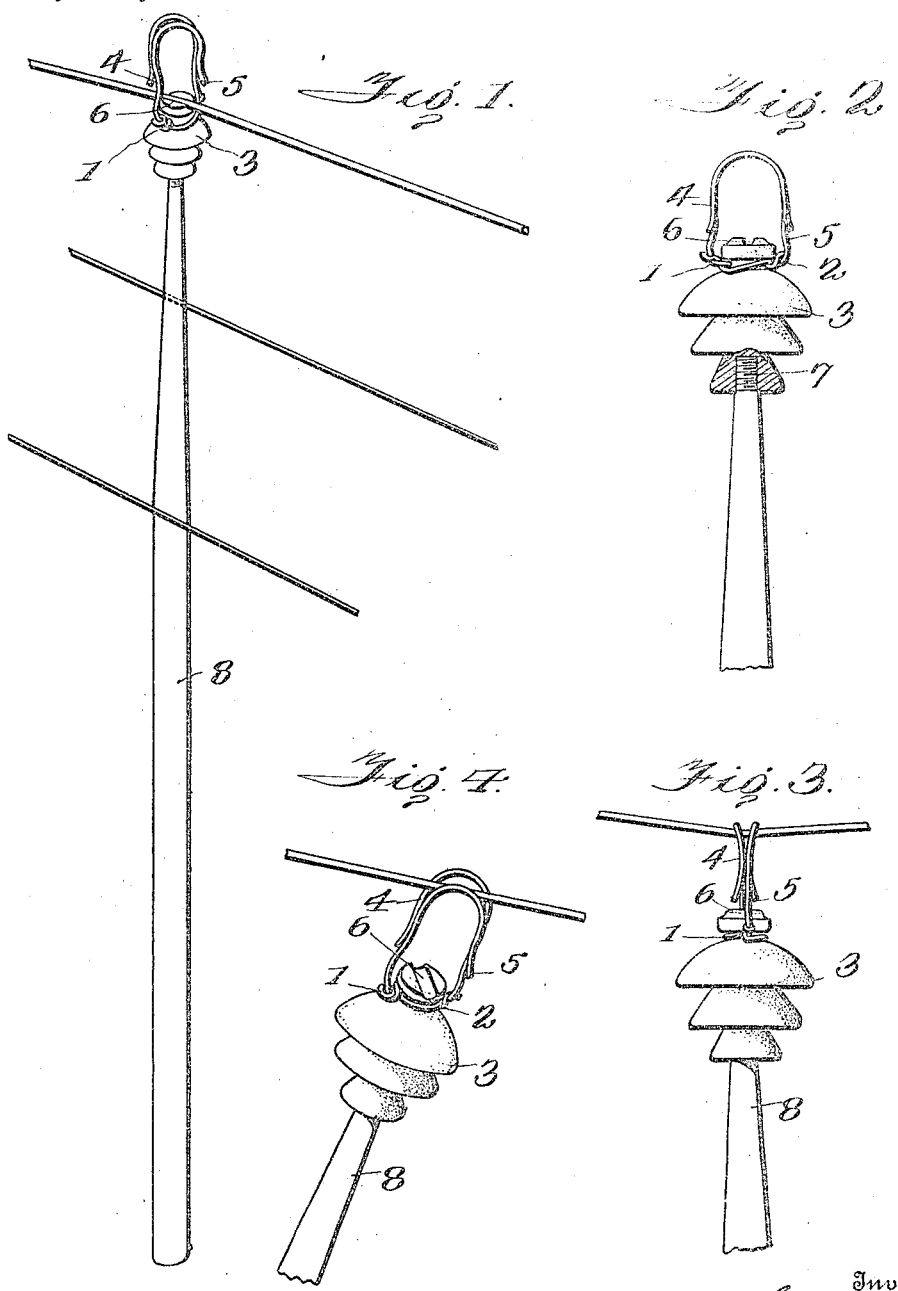

UNITED STATES PATENT OFFICE.

JEREMIAH CRONIN, OF WAPAKONETA, OHIO, ASSIGNOR TO THE CRONIN ELECTRICAL APPLIANCES COMPANY, OF WAPAKONETA, OHIO.

IMPLEMENT FOR MANIPULATING WIRES ON HIGH-VOLTAGE CIRCUITS.

1,045,680.  Specification of Letters Patent.  Patented Nov. 26, 1912.

Application filed May 13, 1912. Serial No. 697,100.

*To all whom it may concern:*

Be it known that I, JEREMIAH CRONIN, a citizen of the United States, residing at Wapakoneta, in the county of Auglaize and State of Ohio, have invented certain new and useful Improvements in Implements for Manipulating Wires on High-Voltage Circuits, of which the following is a specification.

This invention relates more particularly to an implement for use in manipulating line wires of high potential transmission circuits, while the power is on such wires, the object of the invention being to permit of the manipulation of such wires with the power on, without danger to the workmen, or person handling the implement.

The practical operation of the implement arises for example, in connection with making repairs on high voltage lines, while the power is on. In such a case, it is frequently necessary or desirable to hold certain of said conductors in certain positions, as for example to lift one of the line wires up out of its normal plane of support, or to pull the same to one side of its usual position, for the purpose of temporarily getting it out of the way, or for other purposes, particularly where several wires, as for example in high voltage three-phase circuit are carried on a common cross-arm, or where several cross-arms carry a number of different wires. To permit this to be done with safety to the workmen, it is necessary that the wires so manipulated should not be liable to slip away from the implement and also that very thorough insulation should be provided, so as to insure perfect safety to the workmen.

The present invention has for its object, the provision of such an implement and in order to more particularly describe said invention, reference will be had to the accompanying drawing, wherein—

Figure 1 represents in perspective, one form of said implement, showing the same in the act of raising a line wire; Fig. 2 is a sectional elevation of said implement with its handle broken away; Fig. 3 is a side elevation of said implement with its handle broken away; and Fig. 4 is a similar view of said implement, showing the same in the act of pulling a wire.

In the form of the said invention shown in the accompanying drawing, which comprises, among other parts, two wires 1 and 2, passing in opposite directions, or around opposite sides of the neck of a high potential petticoat insulator 3, after the manner of tie-wires, one end of each of said wires being twisted around the other, as indicated, while the other ends are bent upward and then downward in opposite directions to form two hook members 4 and 5, the openings of which are substantially above a groove or slot 6 in the top of the insulator.

This insulator may be, and preferably is, one of the regular commercial high potential petticoat insulators, in which is formed an opening 7 for the supporting pin. In this opening 7 is secured, one end of a pole handle 8, preferably of wood.

When it is desired to lift a wire by means of this implement, as shown in Fig. 1 for example, the wire is entered between the hooks 4 and 5, as shown, and the implement is then turned and the wire rests in the slot 6. Any tendency on the part of the wire to slip upward or laterally will be checked by means of these hooks.

The insulator 3 thoroughly insulates the workmen from the wire being manipulated, so that the operation may be carried on with absolute safety. In pulling a wire to one side, the hooks 4 and 5 come into play, as indicated for example in Fig. 4.

Having fully described my said invention, what I claim is:—

1. An implement of the character described, comprising an insulator mounted on a suitable rod, and two hooks secured to the insulator and arranged side by side in reverse positions, so that a line wire may be passed between them and be received within the loop formed by the hooks.

2. An implement of the character described, comprising an insulator mounted on a rod, and two wire members fastened together around the insulator, each member being bent upwardly and downwardly to form two reversely-arranged hooks side by side, so as to permit a line wire to be passed between said hooks and be received within the loop formed thereby.

3. An implement of the class described, comprising high voltage insulator of the petticoat type, two upwardly extending hooks comprising two wire extensions wrapped around the neck of said insulator, bent upwardly and then downwardly in opposite directions to form a loop, and a rod carrying said insulator.

4. An implement of the class described, comprising a high voltage insulator of the petticoat type, two wires passing partly around opposite sides of the neck of said insulator, and wrapped around each other, each of said wires having an extension bent upwardly and then bent downwardly in opposite directions to form two reversely-positioned hooks, arranged side by side and adapted to receive a wire through the open ends of said hooks above the top of said insulator, and a rod carrying said insulator.

In testimony whereof I affix my signature in presence of two witnesses.

JEREMIAH CRONIN.

Witnesses:
W. W. WHITTINGTON,
GRACE SHAWBER.